Dec. 11, 1962 R. BOEKEMEIER 3,068,075
AXIALLY VALVED MIXER
Filed Dec. 2, 1958
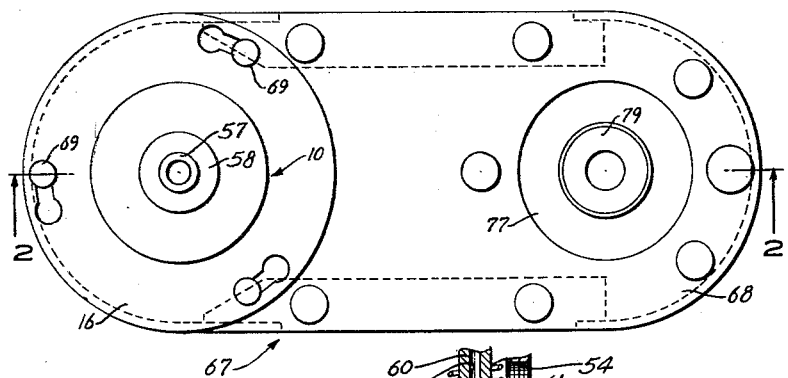
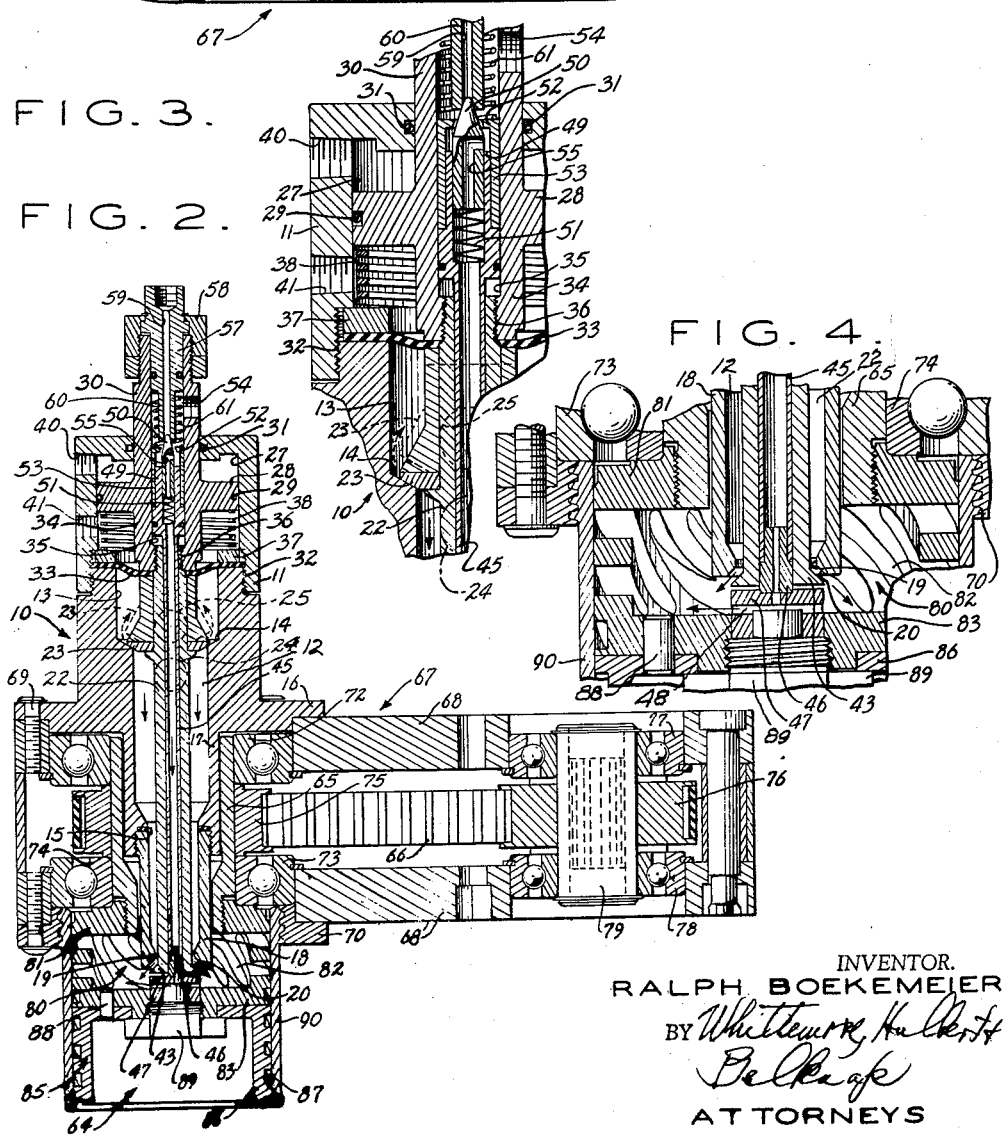
INVENTOR.
RALPH BOEKEMEIER
BY *Whittemore, Hulbert*
*Belknap*
ATTORNEYS 3,068,075
AXIALLY VALVED MIXER
Ralph Boekemeier, Detroit, Mich., assignor to Mechanical Handling Systems, Inc., Detroit, Mich., a corporation of Michigan
Filed Dec. 2, 1958, Ser. No. 777,668
5 Claims. (Cl. 23—252)

The present invention relates to improvements in equipment for the production of cushions, pads and like articles of a foam-expanded latex, resin or like elastomeric composition, by which equipment the elastomeric component, such as a urethane prepolymer or the like, is mixed with a catalyst or other liquid reacting agent just prior to the discharge of the mix to a forming mold. More particularly, the invention relates to a fluid metering, and recirculating or recycling type of mixer unit for such equipment, by which the discharge of the foam product can be interrupted from time to time, as when a filled mold is removed for curing and the next mold advanced into filling position. The mixer enables the prepolymer and catalyst fluids to be continuously recirculated during such period of interrupted discharge.

It is an object of the invention to provide a mixer unit of this sort, in which metered fluids are discharged into a mixing rotor section thereof as concentric streams at the center of the mixing rotor, and in which the valving of these fluids is such that quick, non-drip, cut off of both streams is obtained. In accordance with this object advantage is taken of the use of centrifugal forces at high rotative speed to prevent valve and other surfaces becoming fouled or clogged.

Another object is to provide an improved mixer whose mixing rotor is built in plural stages. A first stage is designed for optimum through-flow characteristics alone, to obtain a good initial distribution of the metered fluids and to keep the central valving and orifice areas clean at all flow rates within the rating of the mixer. The several stages are physically separable, and the later staging of the rotor is designed to provide intensive mixing of the sort best suited for the flow rates and types of fluids being mixed.

A further object is to provide a unit in which the valve assembly for the prepolymer and catalyst is a unitary one, and can be easily installed or removed as a unit from the rest of the mixer. A diaphragm seal separates a prepolymer inlet and primary valve chamber from an air cylinder actuating the prepolymer and catalyst valving, this cylinder being at the top of the mixer, and the prepolymer discharge fans out into a mixing chamber at the bottom of the mixer. The proportions of the discharge valve seat at this point provide a quick, non-drip cut-off, and return or recirculation of the prepolymer is governed at the primary valve seat, once cut-off is made.

A still further object is to provide a mixer as described in which an improved catalyst valve is located within a tubular stem of the prepolymer valve and is actuated by the movement of the stem as the prepolymer valve opens and closes; and in which a floating valve pin or plunger of the catalyst valve acts against a seat to close the catalyst discharge opening. In the open position of the prepolymer valving, the pin is depressed by movement of the prepolymer valve stem, which opens a catalyst discharge port and closes a catalyst return line.

Yet another object is to provide a mixer having catalyst valve provisions as described, in which the catalyst is discharged downwardly through the prepolymer valve stem to a part which itself discharges through a number of radial orifices to the mixing section of the unit. This protects the catalyst discharge orifices from clogging by prepolymer, due to the centrifugal forces in the mixing section. It also gives a good pre-mix distribution as the catalyst is slung into the prepolymer stream.

A still further object is to provide a mixer having a mixing rotor mounted on a driving quill which is timing belt driven, with improved means to form a plural stage structure for the rotor and to pilot the rotative parts in an accessible way. The mixing rotor has a close fitting jacket which also acts as a shear wall for intensive mixing of the materials.

The clearance between the rotor and the jacket wall is critical, and for this reason the jacket is fabricated of a suitable, self-lubricating synthetic plastic material, with a very close initial fit to the rotor. Binding and galling is prevented during no-flow operation by the self-lubricating properties of the jacket; and during the flow periods overheating is prevented by the differential in expansion rates between the jacket and rotor.

The foregoing as well as other objects will become more apparent as this description proceeds, especially when considered in connection with the accompanying drawings illustrating the invention, wherein:

FIG. 1 is a top plan view of the improved mixer unit of the invention;

FIG. 2 is a view in vertical section through the unit, along line 2—2 of FIG. 1; and FIGS. 3 and 4 are fragmentary views in section similar to FIG. 2, but in enlarged scale to better show certain details.

The improved mixer comprises a tubular upright housing or body 10 of sufficient rigidity to stably sustain the rotative and other moving parts to be described; and a centrally apertured cap or bonnet 11 of inverted cup-shaped cross section is threadedly applied to the top of the body, coacting with the latter in defining certain valve and control chamber and passage means to be described.

The body or housing 10 is formed to provide a cylindrical prepolymer flow bore or chamber 12 intermediate the length thereof, and is counterbored above this chamber to provide a valve chamber 13 communicating therewith past a mildly tapered valve seat 14, this seat being formed on an internal annular restriction of housing 10. Flow chamber 12 communicates downwardly with a coaxial port 15 of restricted diameter, and in this zone, i.e., directly beneath an integral annular flange 16 on the mixer body 10, the body is reduced in external diameter in the form of an integral extension sleeve 17. A tubular valve seat member 18 is threaded upwardly into the end of sleeve 17.

The lower end of the valve seat member 18 has an internally restricted part or mouth 19 on which a downwardly and outwardly flaring conical valve seat 20 is formed. Thus the housing body 10 and the valve seat member 18, in effect a tubular axial extension of the body, provide the coaxial upper and lower valve seats 20 and 14 for the control of flow of the fluid prepolymer.

To accomplish this control, the mixer is provided with an elongated hollow tubular valve stem 22 received coaxially in the prepolymer flow chamber 12 and interior of the tubular valve seat member 18. The valve stem 22 has a tapered primary valve element 23 of tubular form secured thereon adjacent the upper valve seat 14 of body 10, for coaction with the latter in permitting the discharge of prepolymer during the mixing operation of the unit, or its recirculation to a source of supply. Body 10 is provided with a radial prepolymer inlet port 24 through its wall in a zone just beneath the valve seat 14, and with a radial prepolymer return or recirculation port 25 in the opposite side of the wall and above the seat 14. Thus it is seen that with the valve stem 22 in the lowered position shown in FIGS. 2 and 4 the seat 14 is sealed for the circulation of prepolymer fluid under pressure downwardly from inlet port 24 through the chamber 12 to the mixing means of the unit (to be described). However, in an elevated position of valve stem 22 the seat 14 is open. The lower or secondary valve seat 20 is at this time closed (by valve means on stem 22 to be described), so that prepolmer discharged to the chamber 12 through inlet opening 24 circulates upwardly past seat 14 into the valve chamber 13, and out the return port or opening 25 to the pressure source.

The means for effecting vertical movements of valve stem 22 as described are contained within the top cap or bonnet 11. This bonnet provides an internal cylinder 27 in which a piston 28 is slidably received, with an O-ring 29 on the piston sealing the cylinder wall. An integral upper stem sleeve extension 30 of piston 28 is piloted in an axial opening of cap or bonnet 11, with a sealing O-ring 31 applied. The threaded engagement of the bonnet 11 on the top of the body 10, as at 32, serves in part to mount a suitable flexible diaphragm 33 by which the cylinder 27 is sealed from the upper valve chamber 13 of body 10.

The piston 28, its upper tubular extension 30 and a similar lower extension 34 are provided with a bore 35 extending axially throughout the same, this bore serving as a catalyst valve or control chamber in a manner to be described, and the lower end of the bore 35 is threadedly engaged at 36 with the upper threaded end of valve stem 22, clamping the inner periphery of the diaphragm 33 against the upper end of the tubular valve member 23 in this zone. The outer periphery of the diaphragm 33 is clamped downwardly against the top of valve body 10 by means of a washer 37 engaged from above by an annular shoulder of the bonnet 11; and washer 37 axially sustains a coil compression spring 38 which acts upwardly against piston 28.

A radial compressed air inlet port 40 is formed in bonnet 11 to communicate with the cylinder 27 above piston 28, and a similar air outlet port 41 in the bonnet communicates with the cylinder 27 beneath piston 28.

Accordingly, as air pressure is applied through port 40 the piston 28 is urged downwardly against the effort of spring 38, thereby closing valve member 23 against the upper seat 14, for the circulation of fluid prepolymer from its inlet port 24 downwardly through the body and chamber 12 in the manner described.

The lower end of prepolymer valve stem 22 is equipped with a conical valve head 43 for coaction with the flared valve seat 20 of the tubular member 18, the head 43 being fixed to the stem 22 for axial movement therewith. Accordingly, it is seen that with the upper valve member 23 sealing the upper seat 14, and annular flow passage is opened between the lower seat 20 and valve head 43 for the outflow of prepolymer fluid to the rotary mixing unit or section (to be described). When head 43 is closed upwardly against seat 20, such flow is blocked and recirculatory or return flow of the prepolymer takes place through seat 14 and out port 25 in the manner described above.

Valve stem 22 is slidable relative to an elongated internal liner tube 45, which tube opens downwardly through a flow restriction element 46 in the lower end of the tube. Tube 45 receives the flow of catalyst fluid in the operation of the unit, the volume of which fluid is, of course, considerably less than that of the prepolymer. Restriction 46 seats downwardly against a rotor retainer plug 47 (to be described), communicating downwardly with an axial opening and a plurality of radial passages 48 in this plug, through which the catalyst is discharged outwardly to the mixer unit to be described.

The liner tube 45 extends upwardly above the top of valve stem 22 and into the catalyst control bore or chamber 35 of piston 28, where it is equipped with a fixed plunger member 49 in sealed relation to the wall of chamber 35. Plunger member 49 has an axial bore in which a further valve pin element 50 is received for axial floating movement, being urged upwardly by a small coil spring in the plunger bore. The valve pin 50 is thus urged for engagement upwardly against the axial valve seat 52 of an inverted cup-like valve member 53 fixed on plunger 49, so that with valve element 50 so upwardly engaged, the flow past the seat 52 is cut off.

A radial catalyst inlet port 54 is formed in the top extension 30 of piston 28, in communication with the bore of chamber 35 thereof; and it is seen that, with the valve pin 50 in its depressed position of FIGS. 2 and 3, in which it is placed upon downward movement of piston 28 (through an intervening agency to be described), an inflow of catalyst downwardly past seat 52 is possible.

The valve pin 50 is ported and provided with an axial bore 55, through which such flow is communicated to the catalyst liner tube 45, thence through the restriction 46 and radial passages 48 to the mixer unit. Of course, downward shifting of valve pin 50 takes place only when piston 28 is moved downwardly, to respectively close and open the prepolymer valve seats 14 and 20. As will be evident to those skilled in the art, the internal porting of pin 50 may be dispensed with if desired, the desired flow taking place through appropriate radial clearance between pin 50 and the plunger bore in which it floats.

For the return or recirculatory flow of catalyst, as when the mixer of the invention is not in use, a hollow plug 57 is fitted into the top of the piston extension 30, with an O-ring to seal the same, and with a nut element 58 threaded on the extension to hold the plug in place. Plug 57 has an axial bore 59, through which it is adapted to be connected with an external catalyst return or recirculatory line (not shown). A lower extension 60 of plug 57 terminates above the valve seat 52, and a coil spring 61 surrounds this restricted extension, acting against the plug 57 to urge the valve element 53 and plunger 49 downwardly. When piston 28 and stem 24 are depressed, in the mixing phase, the plug 57 is similarly depressed, and the extension 60 engages pin 50 to disengage the latter from sealing relation to valve seat 52. It is also seen that when the piston 28 moves upwardly the plug 57 rises with it, occasioning a closure of the valve pin 50 against seat 52 as the plug 57 parts company with the pin, and communication is opened between the catalyst inlet port 54 and the recirculating bore 59 of plug 57, as similar communication is established between the prepolymer inlet and recirculating ports 24 and 25.

The mixing rotor of the improved unit is generally designated 64, being preferably fabricated of stainless steel. It is driven by an axial quill 65 (itself actuated by provisions to be described) to rotate rotor 64. The driving provisions include a timing belt 66 mounted within a housing 67 fixedly secured to the mixer body 10 and extending radially outwardly thereof. Housing 67 may comprise an upper plate member 68 fitted beneath and piloted on the flange 16 of body 10, and releasably secured throughout by a plurality of bayonet and slot connections 69, together with a like-shaped lower housing member 68' suitably secured by a flanged clamping ring 70 in similar fixed relation to the housing body.

The quill 65 is axially upwardly telescoped over the lower extension 17 of body 10, with appropriate rotating clearance, and the upper end of the quill is mounted in the inner race of a ball bearing 72 sustained by housing 67. A similar ball bearing 73 rotatably supports the lower end of quill 65, and the inner race 74 of bearing 73 serves as a rotary pilot for the mixer rotor 64.

A toothed pulley 75 is drivingly secured to the quill between the bearings 72, 73, about which pulley the timing belt 66 is trained. The belt extends laterally within housing 67 and is further trained about a second toothed pulley 76 adjacent the outer end of the latter, with ball bearings 77, 78 journalling the pulley 76 for anti-friction rotation in the housing 67. Pulley 76 is preferably provided with an internally splined driving sleeve 79, which sleeve is adapted to receive and be driven by any suitable power shaft, thus to rotate the rotor 64 through the quill 65.

As shown in FIG. 4, the rotor 64 is in two sections. An upper primary section (generally designated 80) includes a top plate 81 which is threadedly engaged upwardly on the lower end of quill 65, being piloted in the manner mentioned above by the inner race 74 of the lower ball bearing 73. Primary rotor stage 81, in addition, includes an open helix mixing formation 82 connected at its top to the periphery of plate 81 and at its bottom to the periphery of a bottom plate 83 of mixer stage 80 in which the rotor retaining plug 47 is centrally received.

The second stage of rotor 64 is generally designated 85. It comprises a centrally apertured cylindrical member 86 of inverted cup-like section, provided on its exterior surface with a helical way 87 which communicates upwardly and outwardly of the member 86 with the helix 82 of the primary stage.

Rotor stage member 86 is axially piloted upon a central formation of the bottom plate 83 of the primary stage. It is driven by the latter through the agency of one or more dowels 88 connecting it to plate 83, and is held thereon by a retainer nut 89, which nut affords the plug 47 against which restriction 46 of the valve stem liner tube 45 downwardly abuts, and in which restriction the catalyst discharge or slinger passages 48 referred to above are formed.

Rotor 64 is surrounded by a cylindrical jacket 90 having a relatively close fit in respect to the helix 82 and helical way 87.

In the operation of the improved mixer accurately metered fluids are discharged into the mixing section as concentric streams and at the center of the mixing rotor 64. The valving of these fluids is such that quick, non-drip, cut off of both streams is obtained. Once in the rotor area, advantage is taken of high centrifugal forces, as at the valve seat 20 and radial catalyst discharge passages 48, to prevent the valving surfaces from becoming clogged. Since the mixing rotor is built in separate stages 80, 85, either stage can be designed for optimum characteristics. Thus a good initial distribution of the metered fluids can be had while keeping the central valving and orifice area clean at all flow rates within the rating of the mixer. The separable later staging of the rotor provides intensive mixing of the sort best suited for the flow rates and types of fluids being mixed. Either stage is replaceable by another helix or other design best adapted to handle the particular prepolymer and/or catalyst being used.

The valve assembly for the prepolymer and catalyst can be easily installed or removed as a unit from the rest of the mixer. The prepolymer discharge fans out into the mixing chamber at the bottom of the valve, and the proportions of the discharge valve seat 20 are such as provide quick, non-drip cut off. The prepolymer inlet and return ports 24 and 25 are preferably controlled by a Teflon faced return valve member 23 for effective sealing and easy breakaway; and actuation of the valve is by a double acting air cylinder-piston arrangement constituting a unitary component of the valve assembly.

The latter is, needless to say, rendered very compact by the telescoped, in-line arrangement of the dual prepolymer and catalyst valve units. The catalyst valve is located within the prepolymer valve stem and is actuated by the movement of the valve stem as the prepolymer valve opens and closes. With equal simplicity and compactness, a floating catalyst valve pin acts against a seat 52, preferably of Teflon or like synthetic plastic, to close the catalyst discharge opening; and can be adjusted to equalize the pressure drops between discharge and return flow conditions, which simplifies the pressure balancing edjustment required.

In regard to the rotary mixer sub-assembly, the first stage 80 of the rotor 64 threads onto the lower end of the quill 65, and the hand of the threads is arranged for self locking operation. The first stage helix 82 forces the materials into the second stage portion 85 and seals the lower ball bearing 73 from the mixed materials. The second stage rotor 86 pilots on the first and the thread hand of its retainer 89 is such that a socket wrench can be applied to this retainer in disassembly of the composite rotor 64 from the driving quill 65. Hand tight reassembly is all that is required.

The close fitting jacket 90 for the mixing rotor 64 also acts as a shear wall for intensive mixing of the materials. The clearance between the rotor and the jacket wall is critical, and for this reason the latter is preferably a relatively thin one of Teflon or equivalent material having a very close initial rotor fit. Binding and galling is prevented during no-flow operation by the self-lubricating properties of the plastic material; and during the flow periods overheating is prevented by the differential in expansion rates between the jacket 90 and stainless steel rotor 64.

Drive of rotor 64 from the quill 75 and a timing belt 66 from a pulley 76 which is mounted as part of the mixer assembly, which pulley has a splined bore for receiving a powered shaft, enables a number of drive arrangements to be made. The chief advantage of the offset driving device is that direct and easy access to the valving is obtained for fast removal and replacement. This is consistent with the intent of the invention to permit ready dismantling of all parts, including valving, to simplify maintenance of the mixer.

What I claim as my invention is:

1. A mixer comprising a hollow liquid flow housing having coaxial first and second valve seats in spaced relation therealong, an elongated hollow valve unit movable in said housing and provided with valve members movable therewith coaxially of said respective seats to control flow past the latter in a flow passage in said housing externally of said unit, said housing having inlet and discharge openings to said passage on opposite sides of said first seat, means to move said valve unit to simultaneously open said first seat and close said second seat, and vice versa, the interior of said valve unit providing an internal fluid flow passage and being provided with inlet and discharge openings to said internal passage, means providing at least one valve seat in communication with said flow passage, a valve element to control flow past said last named seat and in said internal flow passage, and means operating said valve element to respectively close and open said last named seat concurrently with the closing and opening of said first valve seat, said hollow valve unit having means located coaxially downstream of said second housing valve seat to discharge fluid from said internal flow passage thereof for mixture with fluid discharged externally of said valve unit through said second valve seat, means providing a mixing chamber in fixed relation to said housing downstream of said second valve seat and said last named discharge means, a mixing rotor rotatable in said mixing chamber, and means to rotate said rotor, said rotor comprising an element providing an open helix formation into which fluids discharge from said second valve seat and said last named discharge means, and a cylindrical element having an external helical formation in communication with said helix formation to receive fluid therefrom, said chamber having an opening through which mixed fluid is discharged from said external helical formation.

2. A mixer comprising a hollow liquid flow housing having coaxial first and second valve seats in spaced relation therealong, an elongated hollow valve unit movable in said housing and provided with valve members movable therewith coaxially of said respective seats to control flow past the latter in a flow passage in said housing externally of said unit, said housing having inlet and discharge openings to said passage on opposite sides of said first seat, means to move said valve unit to simultaneously open said first seat and close said second seat, and vice versa, interior of said valve unit providing an internal fluid flow passage and being provided with inlet and discharge openings to said internal passage, means providing at least one valve seat in communication with said flow passage, a valve element to control flow past said last named seat and in said internal flow passage, and means operating said valve element to respectively close and open said last named seat concurrently with the closing and opening of said first valve seat, said hollow valve unit having means located coaxially downstream of said second housing valve seat to discharge fluid radially outwardly from said internal flow passage thereof for mixture with fluid discharged externally of said valve unit through said second valve seat, means providing a mixing chamber coaxial with said seats and in fixed relation to said housing downstream of said second valve seat and said last named discharge means, a mixing rotor rotatable with small radial clearance in said mixing chamber, and means to rotate said rotor, said rotor comprising an element providing an open helix formation into which fluids discharge from said second valve seat and said last named discharge means, and a cylindrical element having an external helical formation in communication with said helix formation to receive fluid therefrom, said chamber having an opening through which mixed fluid is discharged from said external helical formation.

3. A mixer comprising a housing providing an axial flow chamber having an inlet and discharge and first and second valve seats to communicate with said inlet and discharge disposed in axially spaced relation therealong, an elongated hollow valve stem unit coaxially received in said chamber and provided with valve members externally thereof and axially movable therewith to control said respective seats, said unit defining a fluid flow passage in said chamber externally of the unit in communication with said seats, means to move said valve stem unit axially in the direction of said passage to simultaneously open said first seat and close said second seat, and vice versa, said valve stem unit being provided with an inlet, a discharge, and a communicating internal fluid flow passage sealed from said external passage, and having at least one valve seat communicating with said internal passage, a valve element to control flow past said last named seat and in said last named flow passage, and means operating said valve element to respectively close and open said last named seat concurrently with the closing and opening of said first seat, said valve stem unit having means located coaxially of said second housing valve seat to discharge fluid from said internal flow passage thereof.

4. A mixer comprising a housing providing an axial flow chamber having an inlet and first and second valve seats to communicate with said inlet and discharge disposed in axially spaced relation therealong, an elongated hollow valve stem unit coaxially received in said chamber and provided with valve members externally thereof and axially movable therewith to control said respective seats, said unit defining a fluid flow passage in said chamber externally of the unit in communication with said seats, means to move said valve stem unit axially in the direction of said passage to simultaneously open said first seat and close said second seat, and vice versa, said valve stem unit being provided with an inlet, a discharge, and a communicating internal fluid flow passage sealed from said external passage, and having at least one valve seat communicating with said internal passage, a valve element to control flow past said last named seat and in said last named flow passage, and means operating said valve element to respectively close and open said last named seat concurrently with the closing and opening of said first seat, said valve stem unit having means located coaxially of said second housing valve seat to discharge fluid from said internal flow passage thereof, said discharge means including a radially extending passage to direct fluid into fluid discharged through said second seat.

5. A mixer comprising a housing providing an axial flow chamber having first and second valve seats disposed in axially spaced relation therealong, an elongated hollow valve stem unit coaxially received in said chamber and defining an external flow passage between the unit and chamber communicating with said seats, said unit being provided with valve members axially movable therewith to control said respective seats, said housing having fluid intake and return ports communicating with one another across said first seat when the latter is open, means to move said valve stem unit in the direction axially of the same and said passage to simultaneously open said first seat and close said second seat, and vice versa, said valve stem unit being provided with an inlet and a communicating internal fluid flow passage sealed from said external passage and having at least one valve seat, a valve element to control flow past said last named seat and in said internal flow passage, and means operating said valve element to respectively close and open said last named seat concurrently with the closing and opening of said first seat.

References Cited in the file of this patent
UNITED STATES PATENTS

| | | |
|---|---|---|
| 1,076,444 | Ord | Oct. 21, 1913 |
| 1,773,331 | Wernle | Aug. 19, 1930 |
| 2,665,197 | Rowland | Jan. 5, 1954 |
| 2,672,157 | Branson | Mar. 16, 1954 |
| 2,868,518 | Corby et al. | Jan. 13, 1959 |
| 2,885,268 | Breer et al. | May 5, 1959 |